(No Model.) 2 Sheets—Sheet 1.
W. J. McCOLLOM.
ELECTRIC MOTOR FOR GEISSLER TUBES.
No. 269,082. Patented Dec. 12, 1882.
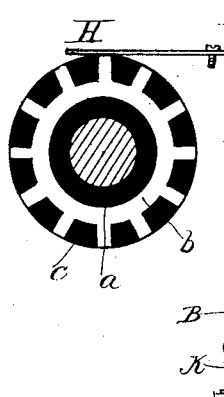
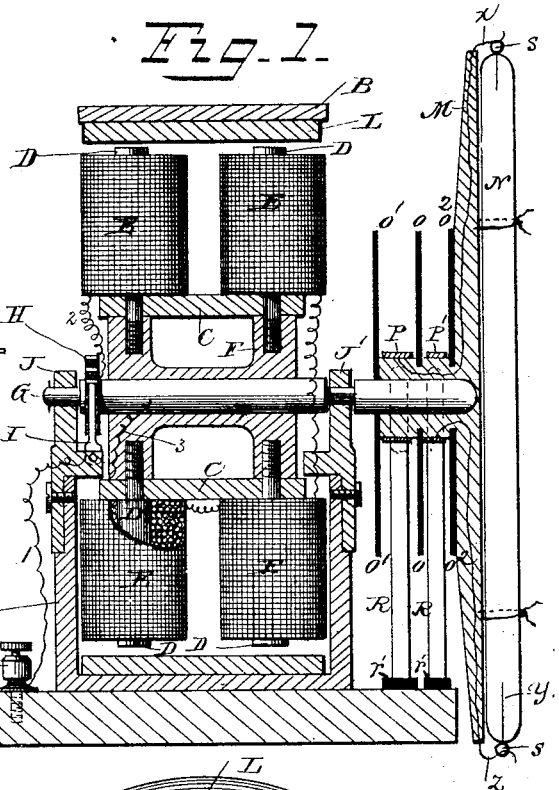
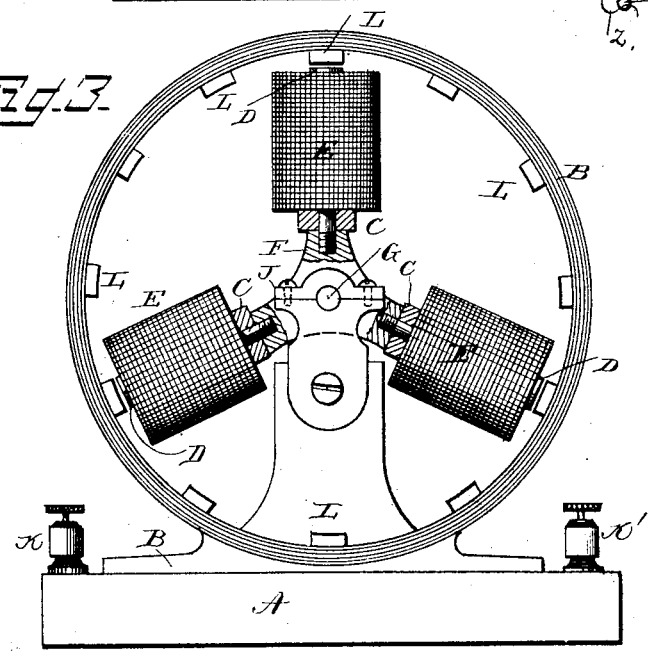
WITNESSES
Franck L. Ourand
Wm L. Spieden
INVENTOR
William J. McCollom
by J. A. Halsted Son
Attorneys (No Model.) 2 Sheets—Sheet 2.
W. J. McCOLLOM.
ELECTRIC MOTOR FOR GEISSLER TUBES.
No. 269,082. Patented Dec. 12, 1882.
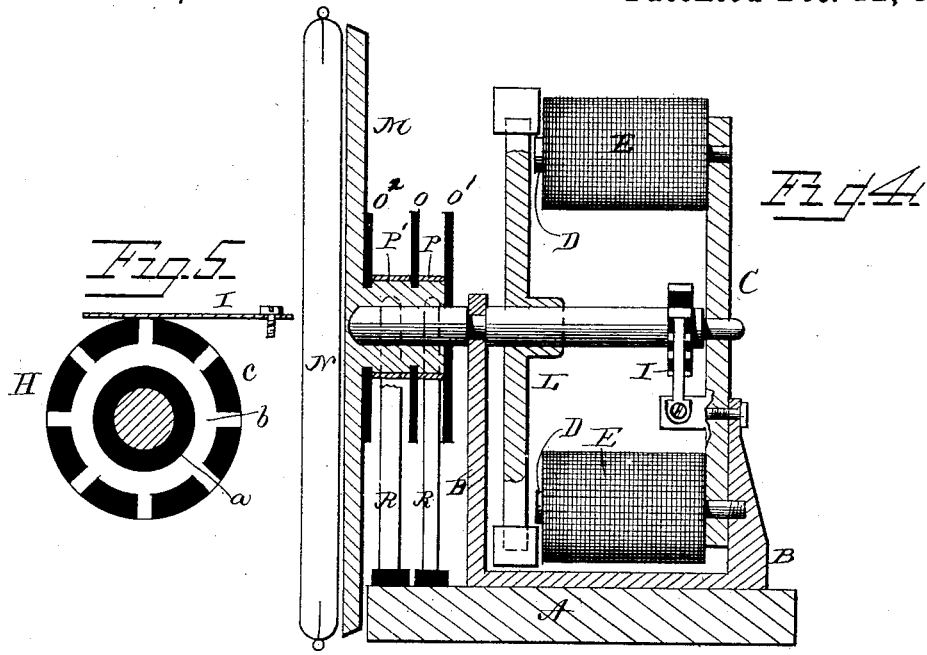
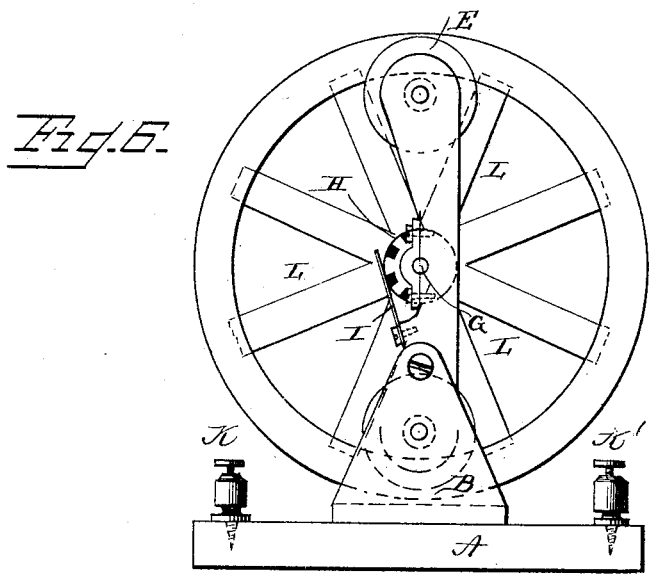
WITNESSES
Franck L. Durand
Wm L. Spider
INVENTOR
William J. McCollom
by
J. J. Halsted & Son Attorneys
N. PETERS, Photo-Lithographer, Washington, D. C.

UNITED STATES PATENT OFFICE.

WILLIAM J. McCOLLOM, OF AURORA, ILLINOIS.

ELECTRIC MOTOR FOR GEISSLER TUBES.

SPECIFICATION forming part of Letters Patent No. 269,082, dated December 12, 1882.

Application filed August 16, 1882. (No model.)

*To all whom it may concern:*

Be it known that I, WILLIAM J. MCCOLLOM, of Aurora, in the county of Kane and State of Illinois, have invented certain new and useful Improvements in a Combined Electro-Magnetic Rotator and Illuminating Apparatus for Show-Windows, &c.; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a novel construction and combination of apparatus, adapted to be operated by electricity generated by a battery or by a dynamo or magneto electric machine; and it may be stated briefly to consist mainly or primarily in combining a rotary electric motor with a rotary glass tube arranged to be illuminated by electricity, this tube being automatically rotated by the shaft of the motor; and it further consists in certain details more particularly hereinafter stated.

The object of the invention is the production of beautiful and attractive luminous effects and figures in rapid motion, and with a wide range of variation as to form and color, and in combinations both of form and color; and, besides other uses, it is peculiarly adapted for making an attractive display in show-windows of stores, &c.

In the drawings, Figure 1 is a vertical central sectional view of an apparatus embodying my invention; Fig. 2, an enlarged transverse section of the circuit-breaker of the rotary motor; Fig. 3, a front view of the main parts of the motor; Fig. 4, a section showing some variations in details from the construction shown in Fig. 1; Fig. 5, a circuit-breaker having fewer teeth than in Fig. 2; Fig. 6, a front view of the main parts of the machine, as shown in Fig. 4.

Referring more particularly to Figs. 1, 2, and 3, on a base, A, preferably of wood, or of hard rubber, gutta-percha, or papier-maché, is mounted a metallic frame, B, of brass or copper, which supports most of the devices.

C are soft-iron yokes of the electro-magnets, into which are secured the cores or pole-pieces D, also of soft iron, wound with insulated copper wire E, thus forming electro-magnets. These cores extend through the yokes C, and being screwed into the central plane F, which is fastened to the shaft G, they clamp the yokes and electro-magnets to the frame. The frame is preferably made of brass, but may be of iron, hard wood, or rubber, steel, or ivory; and the shaft should be of steel, but may be of brass or iron.

H is a circuit-breaker, also affixed to the shaft; I, a spring of steel, brass, or copper, and J J' the shaft-bearings, of brass, steel, copper, iron, or hard wood. The construction of the circuit-breaker will presently be described.

K K' are binding-posts, of brass, steel, copper, or iron.

L L L, &c., are soft-iron armatures (twelve being shown in circular series in Fig. 3) secured to the inner side of the annular portion of the stationary metallic frame B.

The circuit-breaker H is more clearly shown in Fig. 2, in which $a$ is a ferrule or thimble, of wood or of some other non-conducting substance, slipped on the shaft G, to insulate the metallic toothed ring $b$ from the shaft and prevent its touching the same. In the spaces between the teeth of this ring are fitted pieces $c$, of non-conducting material, preferably of ivory. These spaces may be left unfilled in some cases, if desired; but I prefer to fill them, as stated, so that the machine may run with less noise, as the spring I, bearing upon the periphery of the revolving circuit-breaker, is thus permitted to bear smoothly upon its entire periphery without any abrupt jerks or snapping, there being no open spaces left to cause such snapping.

To the extended end of the shaft, and beyond its bearing J', is fitted or attached an insulating strip or piece, M, of wood, hard rubber, ivory, or gutta-percha, and lengthwise of which is fastened a glass vacuum-tube, N, and which may be secured to the strip by strings or by rubber bands, as shown in Fig. 1.

To the hub or shank portion of the strip M (the hub being placed on the shaft G, so as to revolve therewith) are placed two tightly-fitting metallic ferrules, P, separated from each other by an interposed disk, O, preferably of hard rubber, but which may be of ivory, gutta-percha, or hard wood. Two similar circular pieces or disks, O' O², are placed respectively one at each side of the remaining two edges of the ferrules P P'. The object of these disks is to prevent the spark of electricity leaping from one ferrule to the other, to keep it from leaping from one of the ferrules to the shaft, and also to keep it from leaping from one of the ferrules to the wire which conveys the electric spark to the ends of the glass tube N.

R R are metallic springs, preferably of brass, which respectively press one on each of the ferrules, and they are fastened to two insulating pieces, r' r', preferably of hard rubber, at the base A.

Platinum wires s are placed in each end of the glass tube N, their outer ends preferably having loops, to which may conveniently be the attached the wires x z.

The electricity is conducted to the motor or machine by fastening the two conducting-wires of the battery or generator, one in each, respectively, of the binding-posts K K', (one only of these posts being shown in Fig. 1.) The current then flows from the binding-post, through the wire 1, to the spring I, which should be insulated by placing any suitable insulating material (not necessary to be shown) between the head of the screw i' and the spring, the hole in the spring being made considerably larger than the screw, so that the spring and screw may not touch. From this spring I the electric current (when the circuit-breaker H is in the position relatively to the spring as shown in Fig. 2) flows into the toothed ring b, and then by means of the wire marked 2, which is connected or soldered to this ring, it is conducted through all of the electro-magnets and through the wires which connect them together, (see Fig. 1,) and, after passing through all of the electro-magnets, it is conducted through wire marked 3 to the shaft G, to which this wire is soldered. It then flows through the frame F, shaft G, bearings J J', metallic frame B, and by means of a small wire (not necessary to be shown) to the other binding-post in the base A. When the current is flowing through the parts of the machine and through the wires, as above stated, the circuit-breaker relatively to its spring is in the position shown in Fig. 2, and the cores D of the electro-magnets facing somewhere about midway between two of the soft-iron armatures L. As the current flows around the cores D by means of the wire E, these cores become magnetized, and each pair, at the same instant, attracts with great force the armature L which is nearest them, and thus the cores D are drawn toward the armatures and turn until their poles come almost opposite to the soft-iron armatures L which have attracted them, and as the circuit-breaker H moves at the same time, the spring I now rests upon the insulating material, as seen in Fig. 2, thus cutting off the current from the electro-magnets and allowing them to pass by the armatures which have attracted them. If the current were not thus cut off when the magnets face the armatures, the magnets would be held facing the armatures by the force of the magnetism. After a magnet has passed the armature which attracted it and is about midway between it and the next armature, the spring of the circuit-breaker, having now left the insulating material c, touches the next tooth of the circuit-breaker, and the circuit being again closed, the current again flows through the magnets and again attracts the next armature, and the current is again cut off as each of the cores D respectively comes almost in front of the armature which has attracted it, and allows it to pass by. Thus the magnets are attracted by each and all of the armatures in succession, and the system of magnets revolves. The electricity which flows through the vacuum-tube N is an entirely separate and somewhat different current from that which rotates the machine, and must therefore be conducted through two separate conducting-wires to the machine. The current here used is the spark from an induction-coil worked by a battery; or the spark from a glass plate; or any style of frictional electrical machine may be used, in which latter case the induction-coil and the battery which would be used to run it would not be needed.

The two conducting-wires (not necessary to be shown) from the induction-coil should be fastened one wire, respectively, to each of the metallic springs R, and should be of copper wire covered with gutta-percha, as the best insulator to prevent the spark leaping from one wire to the other or to any other object. When these wires are fastened to the springs R the electric spark passes through one of the springs to that one of the ferrules, P, on which the spring rests, into the wire X, which is soldered to the ferrule. It then passes through this wire to one of the loops s of platinum wire in the end of the glass vacuum-tube N, and then through this tube, in the form of a beautiful light, to the platinum wire Y in the other end of the tube, and is conveyed by the wire Z to the other ferrule, P', and its spring R, thus closing the circuit. When the machine is rotated the glass tube N revolves at a high rate of speed, and, with the beautiful light flashing within it, a most charming electric display is produced and in the most complex geometrical figures, with varied tints and blending of colors. The figures and colors are constantly changing, at times appearing to revolve in opposite direction to that in which the machine is always moving, at times seeming stationary, though the machine be still revolving in the same direction; and sometimes the figures appear as three separate rings, each moving in a direction the opposite of another; and, again, at times, when all appear to stand still, they give forth a beautiful wavy light. Many of the attractive changes in these luminous effects may be produced by manipulating or adjusting the platinum-pointed screw which regulates the rate of vibration of the spring of the circuit-breaker on the induction-coil; but this is not the case when using a glass or frictional electric machine for producing the spark through the tube N, and therefore the induction-coil worked by a battery is preferably used.

Referring to Figs. 4, 5, and 6, the cores D and wires E, constituting the electro-magnets, are stationary, while the armatures T revolve with the shaft, and the circuit-breaker is shown with fewer teeth and longer spaces between the teeth. In all other essential features the construction and operation are the same as hereinbefore described.

I claim—

1. In combination with the shaft of a rotary magneto-electric machine, the piece M, mounted on a projection of said shaft and carrying the tube N, disks O O' O², the ferrules P P', and appropriate conducting-wires for illuminating the tube, the combination being substantially as shown, and for the purpose described.

2. In combination, the shaft G, the piece M and its glass tube, disks O O' O², ferrules P P', wires $x\,x$ and $s\,s$, and the metallic conducting-springs R R, each bearing upon one of the ferrules, and operating as set forth.

WILLIAM J. McCOLLOM.

Witnesses:
J. J. McLALLEN,
JAMES McCOLLOM.